(12) United States Patent
Zhang et al.

(10) Patent No.: US 11,477,685 B2
(45) Date of Patent: Oct. 18, 2022

(54) SYSTEM AND METHOD FOR BEAM REPORTING CONTENT

(71) Applicant: Intel Corporation, Santa Clara, CA (US)

(72) Inventors: Yushu Zhang, Beijing (CN); Guotong Wang, Beijing (CN); Alexei Davydov, Nizhny Novgorod (RU); Gang Xiong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 17/252,215

(22) PCT Filed: Oct. 24, 2019

(86) PCT No.: PCT/US2019/057791
§ 371 (c)(1),
(2) Date: Dec. 14, 2020

(87) PCT Pub. No.: WO2020/092109
PCT Pub. Date: May 7, 2020

(65) Prior Publication Data
US 2021/0314801 A1 Oct. 7, 2021

Related U.S. Application Data

(60) Provisional application No. 62/755,266, filed on Nov. 2, 2018.

(51) Int. Cl.
*H04W 24/10* (2009.01)
*H04B 17/318* (2015.01)
(Continued)

(52) U.S. Cl.
CPC .......... *H04W 24/10* (2013.01); *H04B 7/0408* (2013.01); *H04B 17/318* (2015.01); *H04B 17/336* (2015.01)

(58) Field of Classification Search
CPC ... H04W 24/10; H04B 17/318; H04B 17/336; H04B 7/0408
See application file for complete search history.

(56) References Cited

U.S. PATENT DOCUMENTS

2018/0220345 A1 8/2018 Moon et al.
2020/0059283 A1* 2/2020 Venugopal ............ H04W 72/06

FOREIGN PATENT DOCUMENTS

WO WO-2020029160 A1 * 2/2020 .......... H04B 17/318
WO WO-2020051844 A1 * 3/2020 .......... H04B 7/0695

OTHER PUBLICATIONS

International Patent Office—International Search Report and Written Opinion dated Feb. 13, 2020 from International Application No. PCT/US2019/057791, 8 pages.

(Continued)

*Primary Examiner* — Samina F Choudhry
(74) *Attorney, Agent, or Firm* — Schwabe, Williamson & Wyatt, P.C.

(57) ABSTRACT

An apparatus configured to be employed in a user equipment (UE) associated with a new radio (NR) communication system is disclosed. The apparatus comprises one or more processors configured to process a beam reporting configuration signal received from a gNodeB associated therewith. In some embodiments, the beam reporting configuration signal comprises a measurement quantity information on one or more measurement quantities to be reported by the UE to the gNodeB during beam reporting, for a set of beams associated with the gNodeB, wherein the one or more measurement quantities comprises layer 1 signal to interference plus noise ratio (L1-SINR), or both L1-SINR and L1 reference signal receive power (RSRP). In some embodiments, the beam reporting configuration signal further comprises a reference signal information on a reference signal to (Continued)

be utilized by the UE for measuring the one or more measurement quantities for the set of beams associated with the gNodeB.

22 Claims, 3 Drawing Sheets

(51) Int. Cl.
    *H04B 17/336*    (2015.01)
    *H04B 7/0408*    (2017.01)

(56) References Cited

OTHER PUBLICATIONS

Huawei et al., "Beam measurement and reporting using L1-RSRQ and SINR," 3GPP TSG RAN WG1 Meeting #94, R1-1809123, Agenda Item: 7.2 8, Aug. 20-24, 2018, Gothenburg, Sweden, 3 pages.
Xiaomi, "Enhancements on beam management," 3GPP TSG RAN WG1 Meeting #94bis, R1-1811393, Agenda Item: 7.2.8.3, Oct. 8-12, 2018, Chengdu, China, 3 pages.
Vivo, "Discussion on Enhancements on Multi-Beam Operation," 3GPP TSG RAN WG1 #94b, R1-1810403, Agenda Item: 7.2.8.3, Oct. 8-12, 2018, Chengdu, China, 6 pages.
ZTE, "Enhancements on multi-beam operation," 3GPP TSG RAN WG1 Meeting #94bis, R1-1810221, Agenda Item: 7.2.8.3, Oct. 8-12, 2018, Chengdu, China, 8 pages.

\* cited by examiner

SYSTEM AND METHOD FOR BEAM REPORTING CONTENT

CROSS REFERENCE TO RELATED APPLICATIONS

This application is a national phase entry under 35 U.S.C. § 371 of International Application No. PCT/US2019/057791, filed Oct. 24, 2019, entitled "SYSTEM AND METHOD FOR BEAM REPORTING CONTENT," which claims the benefit of and priority to U.S. Provisional Application No. 62/755,266, filed Nov. 2, 2018, entitled "SYSTEM AND METHOD FOR BEAM REPORTING CONTENT", the entire disclosures of which are hereby incorporated by reference.

FIELD

The present disclosure relates to new radio (NR) systems, and in particular, to a system and a method for beam measurement and reporting in NR systems.

BACKGROUND

5G New Radio (NR) technology supports very high data rate with lower latency compared to its predecessor LTE (4G) technology. 5G NR supports mmwave frequency band (from 24.25 GHz to 52.6 GHz). As the mmwave band uses very high frequency, it leads to propagation loss and other losses. To compensate for the losses, directional communication is essential at such frequencies. Antenna arrays with large number of antenna elements make directional communication possible due to smaller wavelengths. Directional communication provides beamforming gain to the radio frequency (RF) link budget which helps in compensation of propagation loss. Moreover, large antenna array helps to achieve higher data rate due to spatial multiplexing technique. These directional links require accurate alignment of transmitted and received beams. In order to achieve alignment of beam pair and to have required end to end performance with desired delay, beam management operations are introduced in the 5G NR. Beam management procedure is used in 5G NR in order to acquire and maintain a set of transmit/receive beams which can be used for downlink (DL) and uplink (UL) transmission/reception.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
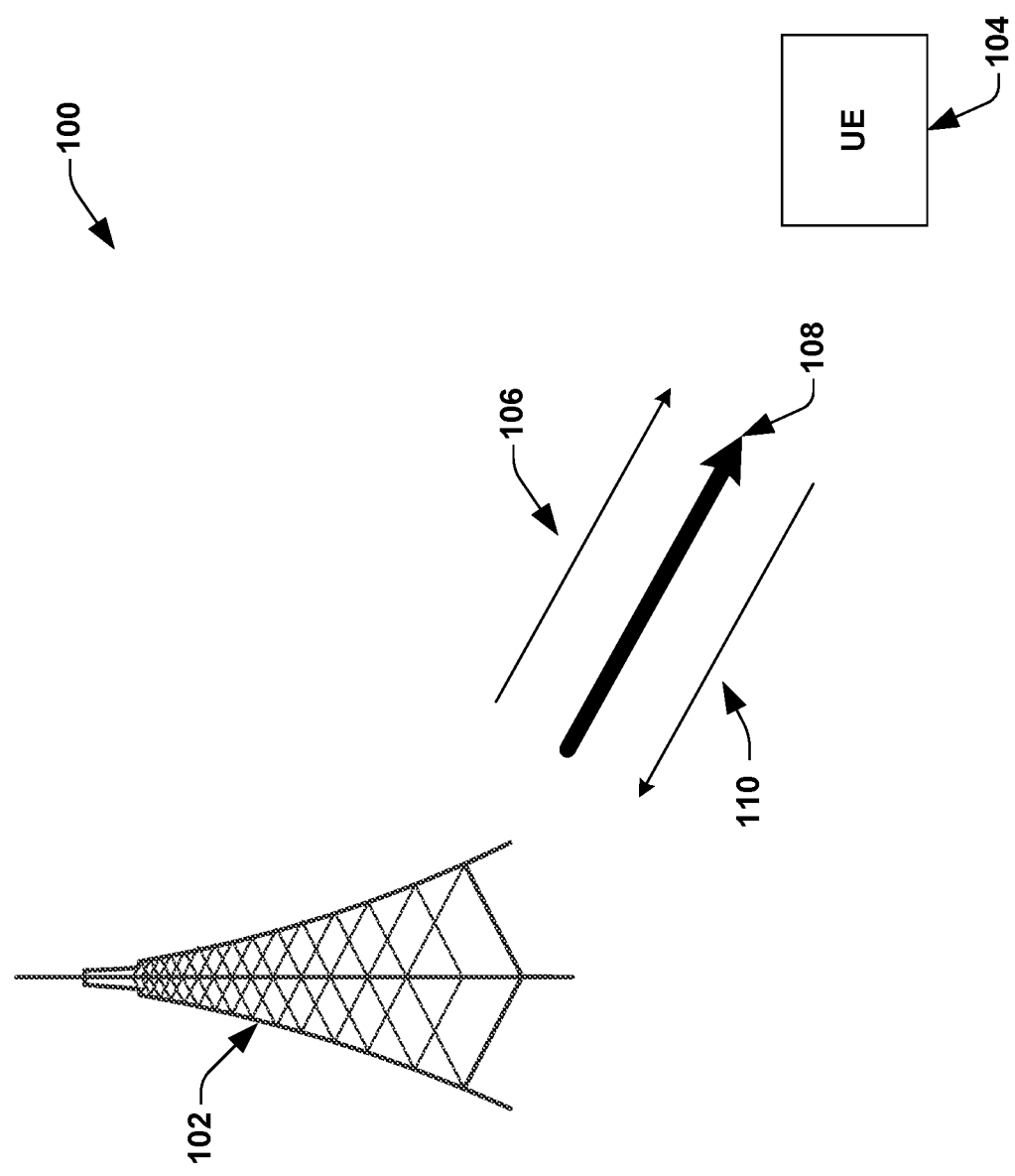
FIG. 1 illustrates a simplified block diagram of new radio (NR) system, according to one embodiment of the disclosure.

In one embodiment of the disclosure, an apparatus configured to be employed in a user equipment (UE) associated with a new radio (NR) system is disclosed. The apparatus comprises one or more processors configured to process a beam reporting configuration signal received from a gNodeB associated therewith. In some embodiments, the beam reporting configuration signal comprises a measurement quantity information on one or more measurement quantities to be reported by the UE to the gNodeB during beam reporting, for a set of beams associated with the gNodeB. In some embodiments, the one or more measurement quantities comprises layer 1 signal to interference plus noise ratio (L1-SINR), or both L1-SINR and L1 reference signal receive power (RSRP). In some embodiments, the beam reporting configuration signal further comprises a reference signal information on a reference signal to be utilized for measuring the one or more measurement quantities for the set of beams associated with the gNodeB, during beam reporting. In some embodiments, the one or more processors is further configured to determine the measurement quantity information and the reference signal information to be utilized for the set of beams during beam reporting, based on processing the beam reporting configuration signal.

In one embodiment of the disclosure, an apparatus configured to be employed in a gNodeB associated with a new radio (NR) communication system is disclosed. The apparatus comprises one or more processors configured to generate a beam reporting configuration signal to be provided to a user equipment (UE) associated therewith. In some embodiments, the beam reporting configuration signal comprises a measurement quantity information on one or more measurement quantities to be reported by the UE to the gNodeB during beam reporting, for a set of beams associated with the gNodeB. In some embodiments, the one or more measurement quantities comprises layer 1 signal to interference plus noise ratio (L1-SINR), or both L1-SINR and L1 reference signal receive power (L1-RSRP). In some embodiments, the beam reporting configuration signal further comprises a reference signal information on a reference signal to be utilized by the UE for measuring the one or more measurement quantities for the set of beams associated with the gNodeB. In some embodiments, the apparatus further comprises a radio frequency (RF) interface configured to provide, to a radio frequency (RF) circuitry, the beam reporting configuration signal, for subsequent transmission to the UE.

In one embodiment of the disclosure, a computer readable storage device storing executable instructions that, in response to execution, cause one or more processors of a UE to perform operations is disclosed. In some embodiments, the operation comprises processing a beam reporting configuration signal received from a gNodeB associated therewith. In some embodiments, the beam reporting configuration signal comprises a measurement quantity information on one or more measurement quantities to be reported by the UE to the gNodeB during beam reporting, for a set of beams associated with the gNodeB. In some embodiments, the one or more measurement quantities comprises layer 1 signal to interference plus noise ratio (L1-SINR), or both L1-SINR and L1 reference signal receive power (RSRP). In some embodiments, the beam reporting configuration signal further comprises a reference signal information on a reference signal to be utilized for measuring the one or more measurement quantities for the set of beams associated with the gNodeB. In some embodiments, the operations further comprise determining the measurement quantity information and the reference signal information for the set of beams, based on processing the beam reporting configuration signal.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, beam management procedure is used in 5G NR in order to acquire and maintain a set of transmit (Tx)/receive (Rx) beams which can be used for downlink (DL) and uplink (UL) transmission/reception. Beam management procedure involves beam reporting from the user equipment (UE) side to the gNodeB, in order to enable the gNodeB to determine the set of Tx beams/Rx beams. In some embodiments, beam reporting refers to a procedure used by the UE to provide beam quality and beam decision information to the gNodeB. In Release-15 3GPP NR, beam reporting based on layer 1 reference signal received power (L1-RSRP) in a beam reporting instance is specified. In some embodiments, L1-RSRP can be used to reflect the Signal to Noise Ratio (SNR). However, in L1-RSRP, interference level is not taken into account. Therefore, in order to account for the interference level during beam reporting, a system and a method for beam reporting based on Layer 1 Signal to Interference plus Noise Ratio (L1-SINR) is proposed in this disclosure. In some embodiments, including L1-SINR as part of beam reporting enables the gNodeB to choose the set of Tx beams/Rx beams by taking interference level into account.

FIG. 1 illustrates a simplified block diagram of a new radio (NR) system 100, according to one embodiment of the disclosure. In some embodiments, the NR system 100 facilitates to perform Layer 1 Signal to Interference plus Noise Ratio (L1-SINR) based beam reporting. The NR system 100 comprises a gNodeB 102 and a user equipment (UE) 104. In other embodiments, however, the NR system 100 can comprise a plurality of gNodeBs and UEs. In some embodiments, the gNodeB 102 is equivalent to a base station, an eNodeB in long term evolution (LTE) systems etc. In some embodiments, the UE 104 may comprise a mobile phone, a tablet computer, an internet of things (IoT) device etc. The gNodeB 102 and the UE 104 are configured to communicate with one another over a communication medium (e.g., air). In some embodiments, the gNodeB 102 and the UE 104 supports multi-beam operation. In order to facilitate beam management, in some embodiments, the UE 104 is configured to perform beam reporting. In some embodiments, the gNodeB 102 is configured to generate a beam reporting configuration signal 106 and provide the beam reporting configuration signal 106 to the UE 104, in order to facilitate beam reporting from the UE 104.

In some embodiments, the beam reporting configuration signal 106 comprises a measurement quantity information on one or more measurement quantities to be reported by the UE 104 to the gNodeB 102 during beam reporting, for a set of beams (e.g., downlink (DL) beams) associated with the gNodeB 102. In some embodiments, the one or more measurement quantities comprises layer 1 signal to interference plus noise ratio (L1-SINR). Alternately, in other embodiments, the one or more measurement quantities comprises both L1-SINR and L1 reference signal receive power (L1-RSRP). In some embodiments, the beam reporting configuration signal 106 further comprises a reference signal information on a reference signal to be utilized by the UE 104 for measuring the one or more measurement quantities for the set of beams associated with the gNodeB. In some embodiments, the reference signal included within the reference signal information comprises a synchronization signal block (SSB). Alternately, in other embodiments, the reference signal included within the reference signal information comprises a channel state information reference signal (CSI-RS). In some embodiments, the gNodeB 102 is further configured to provide the reference signal (as indicated in the beam reporting configuration signal 106) in a plurality of beams 108 associated with the gNodeB 102.

Upon receiving the beam reporting configuration signal 106 at the UE 104 from the gNodeB 102, the UE 104 is configured to process the beam reporting configuration signal 106, and determine the measurement quantity information and the reference signal information to be utilized for the set of beams during beam reporting, based on processing the beam reporting configuration signal 106. In some embodiments, the UE 104 is further configured to determine the set of beams to be reported to the gNodeB 102 during beam reporting, from the plurality of beams 108, based on processing the beam reporting configuration signal 106. In particular, in some embodiments, the UE 104 is configured to determine the set of beams from the plurality of beams 108 associated with the gNodeB 102, based on a measured value of the one or more measurement quantities (as indicated in the beam reporting configuration signal 106) associated with each beam of the plurality of beams 108. For example, when the one or more measurement quantities (as indicated in the beam reporting configuration signal 106) comprises L1-SINR, the set of beams comprises one or more beams having a highest SINR among the plurality of beams 108. Alternately, when the one or more measurement quantities (as indicated in the beam reporting configuration signal 106) comprises L1-SINR and L1-RSRP, the set of beams comprises one or more beams having a highest SINR or a highest RSRP, among the plurality of beams. Further, in some embodiments, the set of beams comprises one or more beams having a highest SINR or a highest RSRP, irrespective of the one or more measurement quantities indicated in the beam reporting configuration signal 106.

In such embodiments, the UE 104 may be configured to determine the measured values of the one or more measurement quantities (as indicated in the beam reporting configuration signal 106) for each beam of the plurality of beams 108, in order to determine the set of beams to be reported to the gNodeB 102. In some embodiments, the one or more measurement quantities for each beam of the plurality of beams 108 are measured based on the reference signal (as indicated in the beam reporting configuration signal 106) included within each beam of the plurality of beams 108. In some embodiments, a number of beams in the set of beams to be reported to the gNodeB 102 is predefined and known to the UE 104. However, in other embodiments, the number of beams in the set of beams to be reported to the gNodeB 102 is provided as part of the beam reporting configuration signal 106. In such embodiments, the beam reporting configuration signal 106 further comprises information on a number of beams in the set of beams to be reported by the UE 104 to the gNodeB 102 during beam reporting.

Upon determining the set of beams to be reported to the gNodeB 102, the UE 104 is further configured to determine measured values of the one or more measurement quantities (as indicated in the beam reporting configuration signal 106) for the set of beams that needs to be reported to the gNodeB 102. Subsequently, in some embodiments, the UE 104 is further configured to determine a beam reporting content to be reported to the gNodeB 102. In some embodiments, the beam reporting content comprises the measured values of the one or more measurement quantities associated with the set of beams. For example, if the set of beams comprises 2 beams, say beam 1 and beam 2, then the beam reporting content comprises a measured value of the one or more measurement quantities associated with beam 1 and beam 2. In some embodiments, the measured values of the one or more measurement quantities for the set of beams comprises absolute values. Alternately, in other embodiments, when the set of beams comprises multiple beams, the measured values of the one or more measurement quantities for the set of beams comprises both absolute values and differential values.

For example, when the set of beams comprises 2 beams, say beam 1 and beam 2, and when the measurement quantity to be reported comprises L1-SINR, the L1-SINR with respect to one of the beams, say beam 1, comprises an absolute value and the L1-SINR with respect to beam 2 may comprise a differential value with respect to the L1-SINR associated with the beam 1 (i.e., a reference beam). In some embodiments, the reference beam comprises a beam of the set of beams that has the highest L1-SINR (when reporting L1-SINR) or the highest L1-RSRP (when reporting L1-RSRP). In some embodiments, the differential L1-SINR and the differential L1-RSRP may be based on a same reference beam, say beam 1. However, in other embodiments, the differential L1-SINR and the differential L1-RSRP may be based on different reference beams.

In some embodiments, the beam reporting content further comprises a set of resource indices respectively associated with the reference signals of the set of beams. For example, if the set of beams to be reported comprises 2 beams, say beam 1 and beam 2, and the reference signal (as indicated in the beam reporting configuration signal 106) comprises CSI-RS, then the beam reporting content comprises a CSI-RS resource indicator (CRI) associated with beam 1 and a CRI associated with beam 2. Similarly, if the set of beams to be reported comprises 2 beams, say beam 1 and beam 2, and the reference signal (as indicated in the beam reporting configuration signal 106) comprises SSB, then the beam report content comprises an SSB resource index (SSBRI) associated with beam 1 and an SSBRI associated with beam 2. In some embodiments, an order in which the measured values of the L1-SINR and/or L1-RSRP and the SSBRI/CRI is indicated in the beam reporting content may be different in different embodiments. In some embodiments, an order in which the measured values of the L1-SINR and/or L1-RSRP and the SSBRI/CRI is indicated in the beam reporting content is predefined, for example, in accordance with a predefined quantization method.

In a first example embodiment, when the set of beams to be reported to the gNodeB 102 comprises 2 beams, that is, beam 1 and beam 2, and the one or more measurement quantities to be reported comprises L1-SINR and L1-RSRP, the beam reporting content may be as follows:

SSBRI or CRI for beam 1
SSBRI or CRI for beam 2
L1-RSRP for beam 1
L1-SINR for beam 1
Differential L1-RSRP for beam 2
Differential L1-SINR for beam 2

In a second example embodiment, when the set of beams to be reported to the gNodeB 102 comprises 2 beams, that is, beam 1 and beam 2, and the one or more measurement quantities to be reported comprises L1-SINR and L1-RSRP, the beam reporting content may be as follows:

SSBRI or CRI for beam 1
L1-RSRP for beam 1
L1-SINR for beam 1
SSBRI or CRI for beam 2
Differential L1-RSRP for beam 2
Differential L1-SINR for beam 2

In a third example embodiment, when the set of beams to be reported to the gNodeB 102 comprises 2 beams, that is, beam 1 and beam 2, and the one or more measurement quantities to be reported comprises L1-SINR and L1-RSRP, the beam reporting content may be as follows:

SSBRI or CRI for beam 1
SSBRI or CRI for beam 2
L1-RSRP for beam 1
L1-SINR for beam 1
Differential L1-RSRP for beam 2
L1-SINR for beam 2

In a fourth example embodiment, when the set of beams to be reported to the gNodeB 102 comprises 2 beams, that is, beam 1 and beam 2, and the one or more measurement quantities to be reported comprises L1-SINR and L1-RSRP, the beam reporting content may be as follows:

SSBRI or CRI for beam 1
L1-RSRP for beam 1
L1-SINR for beam 1
SSBRI or CRI for beam 2
Differential L1-RSRP for beam 2
L1-SINR for beam 2

In a fifth example embodiment, when the set of beams to be reported to the gNodeB 102 comprises 2 beams, that is, beam 1 and beam 2, and the one or more measurement quantities to be reported comprises only L1-SINR, the beam reporting content may be as follows:

SSBRI or CRI for beam 1
L1-SINR for beam 1
SSBRI or CRI for beam 2
L1-SINR for beam 2

The above example embodiments are just possible examples and is not construed to be limited. In other embodiments, the beam reporting content may be defined differently. In the embodiments shown above, when the set of beams to be reported to the gNodeB 102 comprises multiple beams and when the one or more measurement quantities (as indicated in the beam reporting configuration signal 106) comprises both L1-SINR and L1-RSRP, a number of L1-RSRP and a number of L1-SINR that are reported as part of the beam reporting content are the same. That is, the L1-RSRP and the L1-SINR are reported for each beam of the set of beams. However, in other embodiments, when the set of beams to be reported to the gNodeB 102 comprises multiple beams and when the one or more measurement quantities (as indicated in the beam reporting configuration signal 106) comprises both L1-SINR and L1-RSRP, a number of L1-RSRP and a number of L1-SINR that are reported as part of the beam reporting content may be different.

For example, in one embodiment, when the set of beams to be reported by the UE 104 comprises N beams and when the one or more measurement quantities (as indicated in the beam reporting configuration signal 106) comprises both L1-SINR and L1-RSRP, the UE 104 may be configured to report L1-SINR for N beams, where N comprises a number of beams in the set of beams to be reported by the UE 104, and report L1-RSRP for K beams, wherein K<N. In another embodiment, when the set of beams to be reported by the UE 104 comprises N beams and when the one or more measurement quantities (as indicated in the beam reporting configuration signal 106) comprises both L1-SINR and L1-RSRP, the UE 104 may be configured to report L1-RSRP for N beams, where N comprises a number of beams in the set of beams to be reported by the UE and report L1-SINR for K beams, wherein K<N. In some embodiments, the variable N or K or both, may be predefined or configured by higher level signaling. In some embodiments, the UE 104 may be configured to report its capability of the maximum number of N and K it can support to the gNodeB 102.

In one example embodiment, the reporting content when both L1-RSRP and L1-SINR is indicated could be as follows if N=2 and K=1:

SSBRI or CRI for beam 1
SSBRI or CRI for beam 2
L1-RSRP for beam 1
Differential L1-RSRP for beam 2
L1-SINR for beam 1

In another example embodiment, the reporting content when both L1-RSRP and L1-SINR is indicated could be as follows if N=2 and K=1:

SSBRI or CRI for beam 1
SSBRI or CRI for beam 2
L1-SINR for beam 1
Differential L1-SINR for beam 2
L1-RSRP for beam 1

The above example embodiments are just possible examples and is not construed to be limited. In other embodiments, the beam reporting content may be defined differently. Further, in some embodiments, when the reference signal information indicated with the beam reporting configuration signal 106 comprises CS-RS with repetition ON, the beam reporting content reported by the UE 104 to the gNodeB 102 may not include the CSI-RS resource indicator (CRI), since all the CSI-RS resources have the same spatial domain filter associated therewith. In such embodiments, the beam reporting content may include the measured values of the one or more measurement quantities (L1-SINR or both L1-SINR and L1-RSRP) associated with the set of beams and not the CRI associated with the set of beams. Alternately, in some embodiments, when the reference signal information indicated with the beam reporting configuration signal 106 comprises CSI-RS with repetition ON, the beam reporting content reported by the UE 104 to the gNodeB 102 may comprise only CRI and L1-RSRP (and not L1-SINR), since it is not easy to perform UE beam sweeping over both CSI-RS and interference measurement resource (IMR). Upon determining the beam reporting content, in some embodiments, the UE 104 is further configured to generate a beam reporting signal 110 comprising the beam reporting content and provide the beam reporting signal 110 to the gNodeB 102. Upon receiving the beam reporting signal 110, the gNodeB 102 is further configured to process the beam reporting signal 110 comprising the beam reporting content, in order to determine the beam quality associated with the set of beams.

Figures 2, 3:
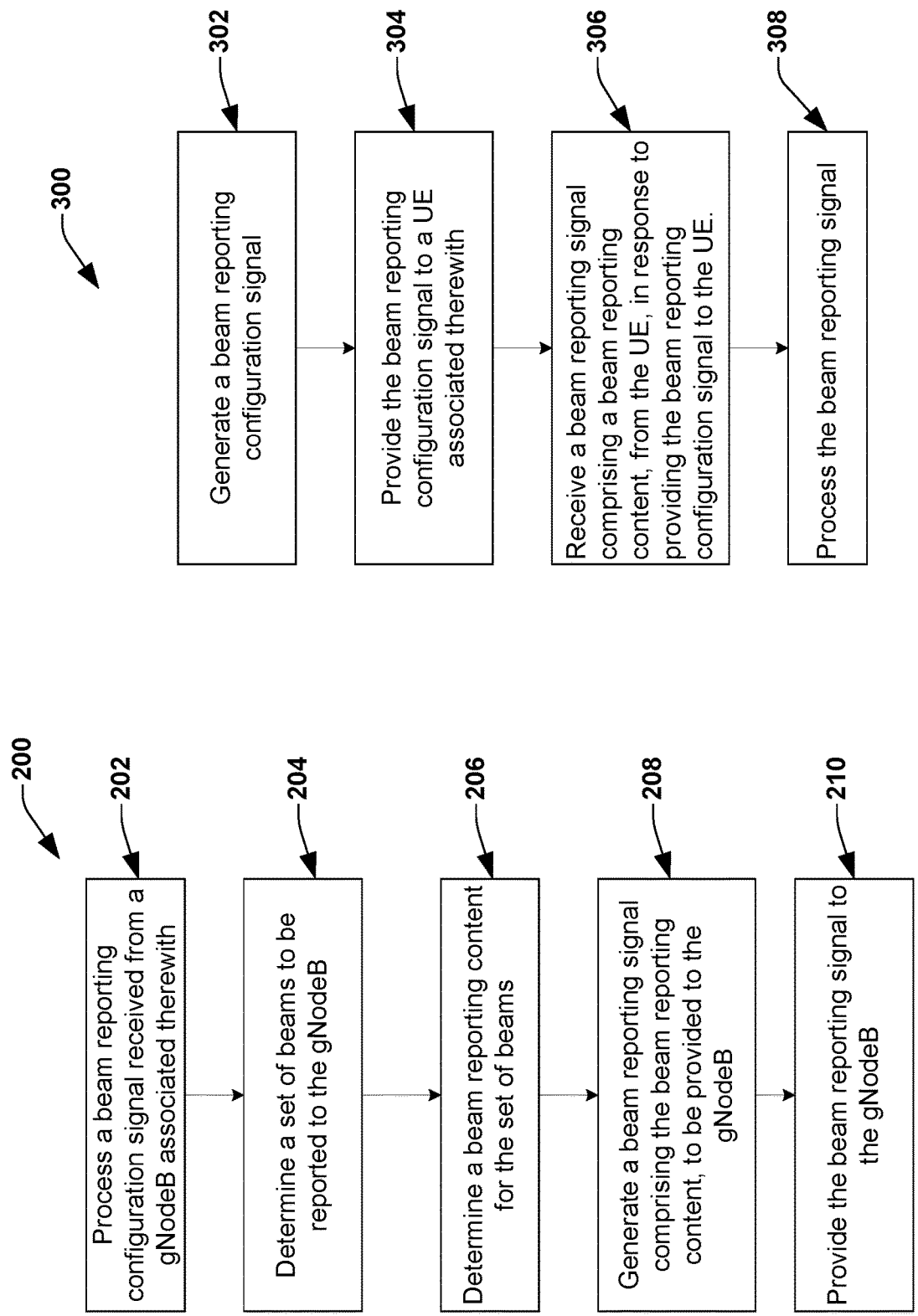
FIG. 2 illustrates a flow chart for a method for a user equipment (UE) configured to perform Layer 1 Signal to Interference plus Noise Ratio (L1-SINR) based beam reporting, according to one embodiment of the disclosure.
FIG. 3 illustrates a flow chart for a method for a gNodeB configured to facilitate Layer 1 Signal to Interference plus Noise Ratio (L1-SINR) based beam reporting, according to one embodiment of the disclosure.

FIG. 2 illustrates a flow chart for a method 200 for a user equipment (UE) to perform Layer 1 Signal to Interference plus Noise Ratio (L1-SINR) based beam reporting, according to one embodiment of the disclosure. In some embodiments, the UE may comprise one or more processors (as explained below in FIG. 5) configured to perform one or more operations associated with the method 200. In some embodiments, the method 200 is applicable to the UE 104 in FIG. 1. Therefore, the method 200 is explained herein with reference to the UE 104 in FIG. 1. However, in other embodiments, the method 200 may be applied to other UEs as well associated with new radio (NR) systems. At 202, a beam reporting configuration signal 106, received from the gNodeB 102, is processed at the UE 104. At 204, a set of beams to be reported to the gNodeB 102 during beam reporting is determined at the UE 104, based on processing the beam reporting configuration signal 106. At 206, a beam reporting content to be reported to the gNodeB 102 is determined at the UE 104, based on processing the beam reporting configuration signal 106. At 208, a beam reporting signal 110 comprising the beam reporting content is generated at the UE 104. At 210, the beam reporting signal 110 is provided to the gNodeB 102 from the UE 104.

FIG. 3 illustrates a flow chart for a method 300 for a gNodeB configured to facilitate Layer 1 Signal to Interference plus Noise Ratio (L1-SINR) based beam reporting, according to one embodiment of the disclosure. In some embodiments, the gNodeB may comprise one or more processors (as explained below in FIG. 4) configured to perform one or more operations associated with the method 300. In some embodiments, the method 300 is applicable to the gNodeB 102 in FIG. 1. Therefore, the method 300 is explained herein with reference to the gNodeB 102 in FIG. 1. However, in other embodiments, the method 300 may be applied to other gNodeBs as well. At 302, a beam reporting configuration signal 106 is generated at the gNodeB 102. At 304, the beam reporting configuration signal 106 is provided to the UE 104 from the gNodeB 102. At 306, a beam reporting signal 110 comprising a beam reporting content is received at the gNodeB 102 from the UE 104, in response to providing the beam reporting configuration signal 106 to the UE 104. At 308, the beam reporting signal 110 is processed at the gNodeB 102, in order to determine beam quality information.

Figure 4:
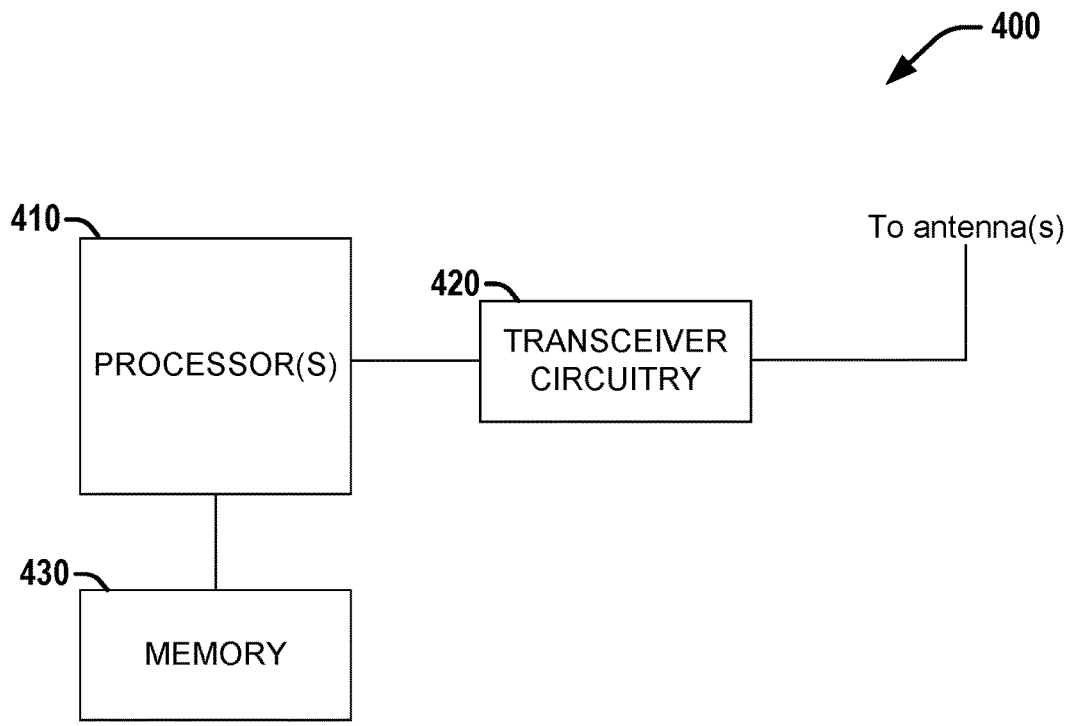
FIG. 4 illustrates a block diagram of an apparatus employable at a Base Station (BS), eNodeB, gNodeB or other network device that facilitates to perform Layer 1 Signal to Interference plus Noise Ratio (L1-SINR) based beam reporting, according to various aspects described herein.

Referring to FIG. 4, illustrated is a block diagram of an apparatus 400 employable at a Base Station (BS), eNodeB, gNodeB or other network device that facilitates to perform Layer 1 Signal to Interference plus Noise Ratio (L1-SINR) based beam reporting, according to various aspects described herein. The apparatus 400 can include one or more processors 410 comprising processing circuitry and associated interface(s) (e.g., a radio frequency interface), communication circuitry 420, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 430 (which can comprise any of a variety of storage mediums and can store instructions and/or data associated with one or more of processor(s) 410 or communication circuitry 420). In various aspects, the apparatus 400 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 410, communication circuitry 420, and the memory 430 can be included in a single device, while in other aspects, they can be included in different devices, such as part of a distributed architecture. In some embodiments, the apparatus 400 could be included within the gNodeB 102 of FIG. 1.

Figure 5:
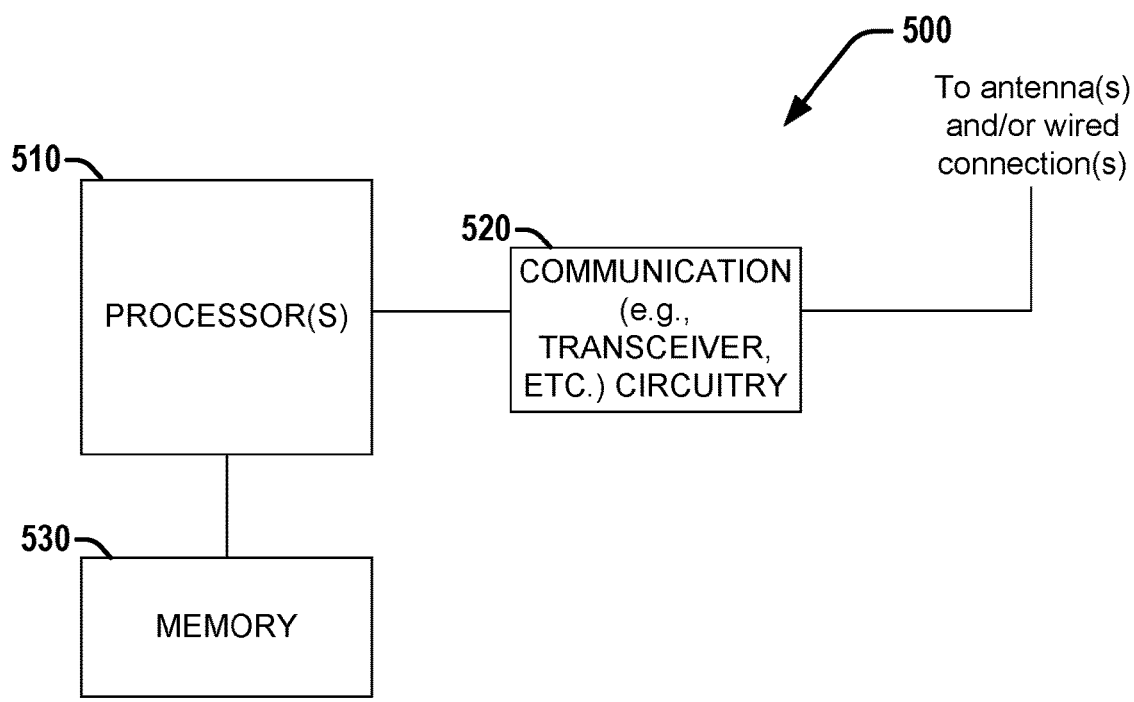
FIG. 5 illustrates a block diagram of an apparatus employable at a user equipment (UE) or other network device (e.g., IoT device) that is configured to perform Layer 1 Signal to Interference plus Noise Ratio (L1-SINR) based beam reporting, according to various aspects described herein.

Referring to FIG. 5, illustrated is a block diagram of an apparatus 500 employable at a user equipment (UE) or other network device (e.g., IoT device) that is configured to perform Layer 1 Signal to Interference plus Noise Ratio (L1-SINR) based beam reporting, according to various aspects described herein. Apparatus 500 can include one or more processors 510 comprising processing circuitry and associated interface(s) (e.g., radio frequency interface), transceiver circuitry 520 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 530 (which can comprise any of a variety of storage mediums and can store instructions and/or data associated with one or more of processor(s) 510 or transceiver circuitry 520). In various aspects, apparatus 500 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 510) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 510) can comprise one or more of: identifying physical resources associated with the signal/message, detecting the signal/message, resource element group deinterleaving, demodulation, descrambling, and/or decoding. In some embodiments, the apparatus 500 could be included within the UE 104 of FIG. 1.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a user equipment (UE) associated with a new radio (NR) system, comprising one or more processors configured to process a beam reporting configuration signal received from a gNodeB associated therewith, wherein the beam reporting configuration signal comprises a measurement quantity information on one or more measurement quantities to be reported by the UE to the gNodeB during beam reporting, for a set of beams associated with the gNodeB, wherein the one or more measurement quantities comprises layer 1 signal to interference plus noise ratio (L1-SINR), or both L1-SINR and L1 reference signal receive power (RSRP); and a reference signal information on a reference signal to be utilized by the UE for measuring the one or more measurement quantities for the set of beams associated with the gNodeB, during beam reporting; and determine the measurement quantity information and the reference signal information to be utilized for the set of beams for beam reporting, based on processing the beam reporting configuration signal.

Example 2 is an apparatus, including the subject matter of example 1, wherein the one or more processors is further configured to determine the set of beams from a plurality of beams associated with the gNodeB, based on a measured value of the one or more measurement quantities associated with the plurality of beams.

Example 3 is an apparatus, including the subject matter of examples 1-2, including or omitting elements, wherein the beam reporting configuration signal further comprises information on a number of beams in the set of beams to be reported to the gNodeB during beam reporting.

Example 4 is an apparatus, including the subject matter of examples 1-3, including or omitting elements, wherein, when the one or more measurement quantities comprises L1-SINR, the set of beams comprises one or more beams having a highest SINR among the plurality of beams.

Example 5 is an apparatus, including the subject matter of examples 1-4, including or omitting elements, wherein, when the one or more measurement quantities comprises L1-SINR and L1-RSRP, the set of beams comprises one or more beams having a highest SINR or a highest RSRP, among the plurality of beams.

Example 6 is an apparatus, including the subject matter of examples 1-5, including or omitting elements, wherein the one or more processors is further configured to determine a beam reporting content to be reported to the gNodeB, wherein the beam reporting content comprises a measured value of the one or more measurement quantities associated with the set of beams.

Example 7 is an apparatus, including the subject matter of examples 1-6, including or omitting elements, wherein, when the set of beams comprises multiple beams, the measured values of the one or more measurement quantities for the set of beams comprises absolute values, or both absolute values and differential values.

Example 8 is an apparatus, including the subject matter of examples 1-7, including or omitting elements, wherein, when the one or more measurement quantities comprises both L1-SINR and L1-RSRP, the beam reporting content comprises L1-SINR for N beams, where N comprises a number of beams in the set of beams to be reported by the UE; and L1-RSRP for K beams, wherein K<N.

Example 9 is an apparatus, including the subject matter of examples 1-8, including or omitting elements, wherein, when the one or more measurement quantities comprises both L1-SINR and L1-RSRP, the beam reporting content comprises L1-RSRP for N beams, where N comprises a number of beams in the set of beams to be reported by the UE; and L1-SINR for K beams, wherein K<N.

Example 10 is an apparatus, including the subject matter of examples 1-9, including or omitting elements, wherein, the beam reporting content further comprises a set of resource indices respectively associated with the reference signals of the set of beams.

Example 11 is an apparatus, including the subject matter of examples 1-10, including or omitting elements, wherein, when the reference signals associated with the set of beams comprises a channel state information reference signal (CSI-RS) with repetition ON, the beam reporting content does not include the set of resource indices respectively associated with the reference signals of the set of beams.

Example 12 is an apparatus, including the subject matter of examples 1-11, including or omitting elements, wherein the reference signal included within the reference signal information comprises a synchronization signal block (SSB) or a channel state information reference signal (CSI-RS).

Example 13 is an apparatus, including the subject matter of examples 1-12, including or omitting elements, wherein the one or more processors is further configured to generate a beam reporting signal comprising the beam reporting content, to be provided to the gNodeB, via a radio frequency (RF) interface.

Example 14 is an apparatus configured to be employed in a gNodeB associated with a new radio (NR) communication system, comprising one or more processors configured to generate a beam reporting configuration signal to be provided to a user equipment (UE) associated therewith, wherein the beam reporting configuration signal comprises a measurement quantity information on one or more measurement quantities to be reported by the UE to the gNodeB during beam reporting, for a set of beams associated with the gNodeB, wherein the one or more measurement quantities comprises layer 1 signal to interference plus noise ratio (L1-SINR), or both L1-SINR and L1 reference signal receive power (L1-RSRP); and a reference signal information on a reference signal to be utilized by the UE for measuring the one or more measurement quantities for the set of beams associated with the gNodeB; and a radio frequency (RF) interface configured to provide, to a radio frequency (RF) circuitry, the beam reporting configuration signal, for subsequent transmission to the UE.

Example 15 is an apparatus, including the subject matter of example 14, wherein the beam reporting configuration signal further comprises information on a number of beams in the set of beams to be reported by the UE to the gNodeB during beam reporting.

Example 16 is an apparatus, including the subject matter of examples 14-15, including or omitting elements, wherein the reference signal included within the reference signal information comprises a synchronization signal block (SSB) or a channel state information reference signal (CSI-RS).

Example 17 is an apparatus, including the subject matter of examples 14-16, including or omitting elements, wherein the one or more processors is further configured to process a beam reporting signal comprising a beam reporting content, received from the UE, in response to providing the beam reporting configuration signal to the UE.

Example 18 is an apparatus, including the subject matter of examples 14-17, including or omitting elements, wherein the beam reporting content comprises a measured value of the one or more measurement quantities associated with the set of beams.

Example 19 is an apparatus, including the subject matter of examples 14-18, including or omitting elements, the beam reporting content further comprises a set of resource indices respectively associated with the reference signals of the set of beams.

Example 20 is an apparatus, including the subject matter of examples 14-19, including or omitting elements, wherein, when the set of beams comprises multiple beams, the measured values of the one or more measurement quantities for the set of beams comprises absolute values, or both absolute quantities and differential values.

Example 21 is a computer readable storage device storing executable instructions that, in response to execution, cause one or more processors of a user equipment (UE) to perform operations, the operations comprising processing a beam reporting configuration signal received from a gNodeB associated therewith, wherein the beam reporting configuration signal comprises a measurement quantity information on one or more measurement quantities to be reported by the UE to the gNodeB during beam reporting, for a set of beams associated with the gNodeB, wherein the one or more measurement quantities comprises layer 1 signal to interference plus noise ratio (L1-SINR), or both L1-SINR and L1 reference signal receive power (RSRP); and a reference signal information on a reference signal to be utilized by the UE for measuring the one or more measurement quantities for the set of beams associated with the gNodeB; and determining the measurement quantity information and the reference signal information to be utilized for the set of beams for beam reporting, based on processing the beam reporting configuration signal.

Example 22 is a computer readable storage device, including the subject matter of example 21, wherein the operations further comprises determining the set of beams from a plurality of beams associated with the gNodeB, based on a measured value of the one or more measurement quantities associated with the plurality of beams.

Example 23 is a computer readable storage device, including the subject matter of examples 21-22, including or omitting elements, wherein the operations further comprises determining a beam reporting content to be reported to the gNodeB, wherein the beam reporting content comprises a measured value of the one or more measurement quantities associated with the set of beams.

Example 24 is a computer readable storage device, including the subject matter of examples 21-23, including or omitting elements, wherein the beam reporting content further comprises a set of resource indices respectively associated with the reference signals of the set of beams.

Example 25 is a computer readable storage device, including the subject matter of examples 21-24, including or omitting elements, wherein the operations further comprises generating a beam reporting signal comprising the beam reporting content, to be provided to the gNodeB, via a radio frequency (RF) interface.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. An apparatus configured to be employed in a user equipment (UE) associated with a new radio (NR) system, comprising:
    one or more processors configured to:
        process a beam reporting configuration signal received from a gNodeB associated therewith, wherein the beam reporting configuration signal comprises:
            measurement quantity information related to a layer 1 signal to interference plus noise ratio (L1-SINR) to be reported by the UE to the gNodeB during beam reporting for a set of beams associated with the gNodeB; and
            reference signal information on a reference signal to be utilized by the UE for measuring the L1-SINR for the set of beams associated with the gNodeB, during beam reporting;
        determine the measurement quantity information and the reference signal information to be utilized for the set of beams for beam reporting, based on processing the beam reporting configuration signal; and
        determine the set of beams from a plurality of beams associated with the gNodeB, wherein the set of beams includes one or more beams having a highest measured SINR among the plurality of beams.

2. The apparatus of claim 1, wherein the beam reporting configuration signal further comprises information on a number of beams in the set of beams to be reported to the gNodeB during beam reporting.

3. The apparatus of claim 1, wherein the measurement quantity information is further related to L1 reference signal received power (RSRP), and the set of beams comprises one or more beams having a highest SINR or a highest RSRP among the plurality of beams.

4. The apparatus of claim 1, wherein the one or more processors is further configured to determine a beam reporting content to be reported to the gNodeB, wherein the beam reporting content comprises a measured value related to one or more SINR values associated with the set of beams.

5. The apparatus of claim 4, wherein, when the set of beams comprises multiple beams, the measured value is an absolute value, or both an absolute value and a differential value.

6. The apparatus of claim 3, wherein the one or more processors is further configured to determine a beam reporting content to be reported to the gNodeB, and when the measurement quantity information is related to both L1-SINR and L1-RSRP, the beam reporting content comprises:
    L1-SINR for N beams, where N comprises a number of beams in the set of beams to be reported by the UE; and
    L1-RSRP for K beams, wherein K<N.

7. The apparatus of claim 3, wherein the one or more processors is further configured to determine a beam reporting content to be reported to the gNodeB, and when the measurement quantity information is related to both L1-SINR and L1-RSRP, the beam reporting content comprises:
    L1-RSRP for N beams, where N comprises a number of beams in the set of beams to be reported by the UE; and
    L1-SINR for K beams, wherein K<N.

8. The apparatus of claim 4, wherein, the beam reporting content further comprises a set of resource indices respectively associated with the reference signals of the set of beams.

9. The apparatus of claim 8, wherein, when the reference signals associated with the set of beams comprises a channel state information reference signal (CSI-RS) with repetition ON, the beam reporting content does not include the set of resource indices respectively associated with the reference signals of the set of beams.

10. The apparatus of claim 1, wherein the reference signal included within the reference signal information comprises a synchronization signal block (SSB) or a channel state information reference signal (CSI-RS).

11. The apparatus of claim 4, wherein the one or more processors is further configured to generate a beam reporting signal comprising the beam reporting content, to be provided to the gNodeB, via a radio frequency (RF) interface.

12. An apparatus configured to be employed in a gNodeB associated with a new radio (NR) communication system, comprising:
one or more processors configured to:
generate a beam reporting configuration signal to be provided to a user equipment (UE) associated therewith, wherein the beam reporting configuration signal comprises:
measurement quantity information related to layer 1 signal to interference plus noise ratio (L1-SINR) to be reported by the UE to the gNodeB during beam reporting for a set of beams associated with the gNodeB; and
reference signal information on a reference signal to be utilized by the UE for measuring the L1-SINR for the set of beams associated with the gNodeB; and
a radio frequency (RF) interface configured to provide, to a radio frequency (RF) circuitry, the beam reporting configuration signal, for subsequent transmission to the UE;
wherein the set of beams is determined by the UE from a plurality of beams associated with the gNB, and wherein the set of beams includes one or more beams having a highest measured SINR among the plurality of beams.

13. The apparatus of claim 12, wherein the beam reporting configuration signal further comprises information on a number of beams in the set of beams to be reported by the UE to the gNodeB during beam reporting.

14. The apparatus of claim 12, wherein the reference signal included within the reference signal information comprises a synchronization signal block (SSB) or a channel state information reference signal (CSI-RS).

15. The apparatus of claim 12, wherein the one or more processors is further configured to process a beam reporting signal comprising a beam reporting content, received from the UE, in response to providing the beam reporting configuration signal to the UE.

16. The apparatus of claim 15, wherein the beam reporting content comprises a measured value related to one or more SINR values associated with the set of beams.

17. The apparatus of claim 16, wherein the beam reporting content further comprises a set of resource indices respectively associated with the reference signals of the set of beams.

18. The apparatus of claim 16, wherein, when the set of beams comprises multiple beams, the measured values related to the one or more SINR values for the set of beams comprises absolute values, or both absolute quantities and differential values.

19. One or more non-transitory computer-readable media comprising instructions that, in response to execution of the instructions by one or more processors of a user equipment (UE), are to cause the UE to perform operations, the operations comprising:
processing a beam reporting configuration signal received from a gNodeB associated therewith, wherein the beam reporting configuration signal comprises:
measurement quantity information related to layer 1 signal to interference plus noise ratio (L1-SINR) to be reported by the UE to the gNodeB during beam reporting for a set of beams associated with the gNodeB; and
reference signal information on a reference signal to be utilized by the UE for measuring the L1-SINR for the set of beams associated with the gNodeB;
determining the measurement quantity information and the reference signal information to be utilized for the set of beams for beam reporting, based on processing the beam reporting configuration signal; and
determine the set of beams from a plurality of beams associated with the gNB, wherein the set of beams includes one or more beams having a highest measured SINR among the plurality of beams.

20. The one or more non-transitory computer-readable media of claim 19, wherein the operations further comprises determining a beam reporting content to be reported to the gNodeB, wherein the beam reporting content comprises a measured value related to one or more SINR values associated with the set of beams.

21. The one or more non-transitory computer-readable media of claim 20, wherein the beam reporting content further comprises a set of resource indices respectively associated with the reference signals of the set of beams.

22. The one or more non-transitory computer-readable media of claim 20, wherein the operations further comprises generating a beam reporting signal comprising the beam reporting content, to be provided to the gNodeB, via a radio frequency (RF) interface.

* * * * *